United States Patent
Lin et al.

(10) Patent No.: US 9,258,152 B2
(45) Date of Patent: Feb. 9, 2016

(54) SYSTEMS, CIRCUITS AND METHODS FOR ADAPTING PARAMETERS OF A LINEAR EQUALIZER IN A RECEIVER

(71) Applicant: Broadcom Corporation, Irvine, CA (US)

(72) Inventors: Andrew Lin, Menlo Park, CA (US); Faramarz Bahmani, Palo Alto, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 14/154,789

(22) Filed: Jan. 14, 2014

(65) Prior Publication Data

US 2014/0126625 A1      May 8, 2014

Related U.S. Application Data

(63) Continuation of application No. 12/973,735, filed on Dec. 20, 2010, now Pat. No. 8,654,830.

(51) Int. Cl.
| | |
|---|---|
| H03K 5/159 | (2006.01) |
| H04L 25/03 | (2006.01) |
| H03H 7/30 | (2006.01) |
| H03H 7/40 | (2006.01) |

(52) U.S. Cl.
CPC ............................... H04L 25/03057 (2013.01)

(58) Field of Classification Search
CPC ............... H04L 25/03057; H04L 2025/0349; H04L 25/03038; H04L 25/03885; H04L 27/2647
USPC ........................... 375/232, 233, 316, 346
See application file for complete search history.

(56) References Cited

U.S. PATENT DOCUMENTS

| | | | |
|---|---|---|---|
| 5,936,445 A | 8/1999 | Babanezhad et al. | |
| 6,049,300 A * | 4/2000 | Shoval | H03M 1/0682 341/143 |
| 8,401,064 B1 | 3/2013 | Lin et al. | |
| 8,416,846 B1 | 4/2013 | Lin et al. | |
| 2003/0081670 A1 | 5/2003 | Bologna et al. | |
| 2004/0136731 A1 | 7/2004 | Wang et al. | |
| 2006/0182172 A1 | 8/2006 | Lin | |
| 2008/0304559 A1* | 12/2008 | Wu et al. | 375/233 |
| 2009/0316772 A1* | 12/2009 | Hidaka | H04L 25/03057 375/233 |
| 2010/0158096 A1* | 6/2010 | Yang et al. | 375/233 |
| 2010/0260253 A1 | 10/2010 | Hovakimyan et al. | |
| 2010/0329325 A1* | 12/2010 | Mobin et al. | 375/232 |

OTHER PUBLICATIONS

U.S. Appl. No. 12/973,735, Andrew Lin, "Systems, Circuits and Methods for Adapting Parameters of Linear Equalizer in a Receiver," filed Dec. 20, 2010.

* cited by examiner

*Primary Examiner* — Ted Wang
(74) *Attorney, Agent, or Firm* — Sterne, Kessler, Goldstein & Fox P.L.L.C.

(57) ABSTRACT

A receiver is optimized by adapting parameters of a linear equalizer component within the receiver. Data decisions and error decisions are generated. These data decision and error decisions are used to derive an error rate of data by measuring the number of margin hits that occur. A balance value is also calculated from the data decisions and the error decisions. The balance value is used to update parameters of the linear equalizer. The updating of the parameter continues until the number of margin hits has been minimized.

20 Claims, 14 Drawing Sheets

SYSTEMS, CIRCUITS AND METHODS FOR ADAPTING PARAMETERS OF A LINEAR EQUALIZER IN A RECEIVER

CROSS REFERENCE TO RELATED APPLICATIONS

This application is a continuation of U.S. patent application Ser. No. 12/973,735, filed Dec. 20, 2010, which is hereby incorporated by reference in its entirety.

BACKGROUND OF THE INVENTION

1. Field of the Invention

The present invention is related to the field of data communications, and more specifically towards systems, circuits and methods for adapting parameters of a linear equalizer in a receiver.

2. Art Background

Electronic circuits utilize serial data transmission to transmit data among one or more circuits. In general, serial data transmission involves transmitting bits in a single bit stream at a predetermined data rate. The data rate is expressed as the number of bits transmitted per second ("bps"). Typically, to transfer data between circuits, the sending circuit employs a transmitter that modulates and sends data using a local clock. The local clock provides the timing for the bit rate. The receiving circuit employs a receiver to recover the data, and in some cases, the clock. The receiver circuit recovers the serial bit stream of data by sampling the bit stream at the specified data rate.

Techniques have been developed in an attempt to optimize the performance of a receiver in order to improve the bit error rate of the data. For example, current receiver optimization techniques involve changing the gain of a variable gain amplifier to reduce the bit error rate of data. Another current example involves adjusting a clock signal in order to optimize the data decision point in the time domain. However, these techniques do not provide the flexibility in the optimization of other components within the receiver.

Accordingly, it is highly desirable to develop a receiver with components where the parameters of the components can be flexibly adapted in response to the bit error rate of the data so that the receiver is optimized.

BRIEF DESCRIPTION OF THE DRAWINGS/FIGURES

The novel features of the invention are set forth in the appended claims. However, for purpose of explanation, several embodiments of the invention are set forth in the following figures.

DETAILED DESCRIPTION

The systems, techniques and circuits disclosed herein improve receiver performance. Specifically, the systems, techniques, and circuits configure the operating parameters of components Within the receiver to reduce the hit error rate of the data transmission.

A brief description of the origin and nature of inter symbol interference (IS) follows. Inter symbol interference is a form of distortion of a communication signal in which one symbol interferes with subsequent symbols. This is undesirable as the distortion has a similar effect as noise and thus makes the communication signal less reliable. Inter symbol interference may arise from various sources throughout a receiver's path. The ISI may be reduced or offset at various points in the receiver path.

Figure 1:
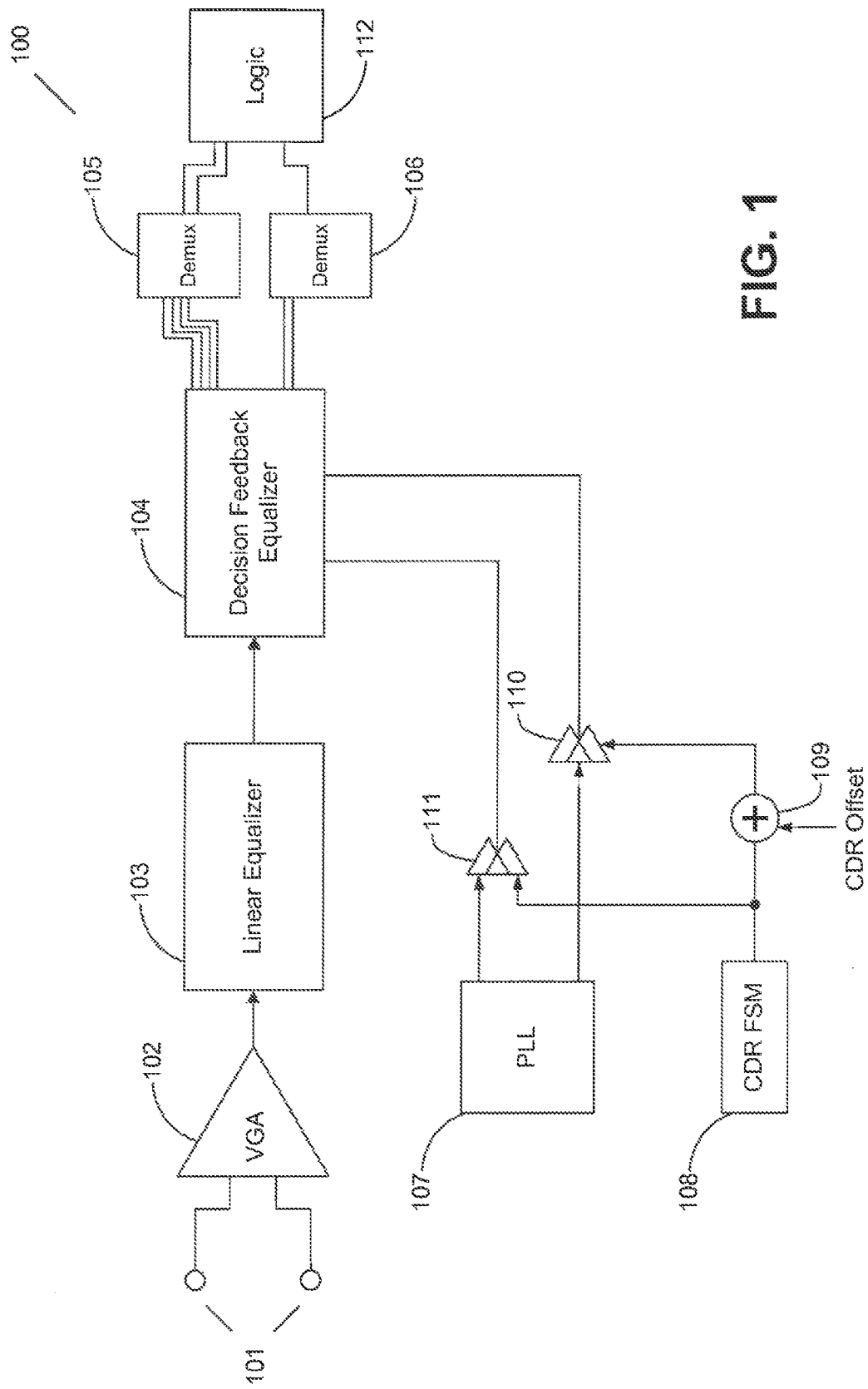
FIG. 1 illustrates an example receiver architecture in accordance with some embodiments of the invention.

FIG. 1 illustrates an example receiver architecture in accordance with some embodiments of the invention. In general, the receiver 100 comprises a variable gain amplifier (VGA) 102, in one embodiment, the VGA 102 receives a differential input 101 that is amplified by the VGA 102. The VGA 102 provides a constant swing to the linear equalizer 103. In general, the linear equalizer provides a high-pass response to reduce inter-symbol interference (ISI) that can result from the loss of the electrical channel. Digital decisions are then made by a decision-feedback equalizer (DFE) 104. The DFE 104 may be a 2-way interleaved, 4-tap adaptive DFE. The DFE 104 cancels out additional channel-induced ISI. The cascading of the linear equalizer 103 with the DFE 104 allows the receiver 100 to equalize a variety of electrical channels with significant interference from past symbols, referred to as post-cursor ISI.

The DFE 104 generates data and error decisions that are formatted by de-multiplexor 105. The decisions of edge slicers within DFE 104 are formatted by de-multiplexor 106. In some embodiments, the de-multiplexors 105 and 106 format the data, error, and edge decisions into parallelized 16-bit wide words. The data, error, and edge words from the de-multiplexors 105 and 106 may be used by a clock and data recovery (CDR) circuitry.

As shown in FIG. 1, a Phase-locked loop (PLL) 107 produces clocks to a pair of clock interpolators 110 and 111. For some embodiments, the PLL 107 produces half-rate clocks to the clock interpolators 110 and 111. In some embodiments, half-rate clocks may be utilized when a 2-way interleaved DFE architecture is used. In other embodiments, the half-rate clocks are generated at 5.156 GHz to 6.25 GHz, depending on the application. The interpolators 110 and 111 produce an in-phase clock signal for edge slicers within DFE 104 and a quadrature clock for the data and error slicers of the DFE 104. The phase difference between the in-phase clock signal and the quadrature clock is set with a digitally controlled CDR offset at summer 109. When the CDR 108 is locked, the in-phase clock (clkI) aligns with the symbol edges at the output of a replica summer in DFE 104. The replica summer in the edge path of the DFE 104, discussed in more detail below, is used to match the delay of the data and error slicers within DFE 104. The replica summer also buffers the output of the linear equalizer 103 from the edge slicers in DFE 104. In some preferred embodiments, the CDR offset is set such that the phase difference between clkI and clkQ, allows the data slicers within DFE 104 to sample the data bits where the bit error rate is minimized. Thus, if the eye at the output of the summers is symmetric with respect to time, the phase difference is $T_{bit}/2$, where $T_{bit}$ is the bit time. In this example embodiment, the process that sets the CDR offset is adaptive, and will adjust the CDR offset to sample the eye at a point where the bit error rate is minimized.

The coefficients, which are adjustable via DFE taps, of the DFE 104 may be adapted through various algorithms as described below. Error slicers compare the amplitude of the equalized eye at the output of the DFE 104 summers to a target, $\Delta$. The data and error slicer decisions are then used by adaptation logic to adjust the DFE 104 coefficients. The point where the error slicer compares the equalized eye to $\Delta$ may also be adjusted by tuning the delay between the error slicer and data slicer clocks. In this way, the point in the equalized eye where the LMS algorithm, or a steepest descent algorithm using margin hits, optimizes can be adjusted. Further details on the architecture, design, and operation of the above referenced components are described below.

Figure 2:
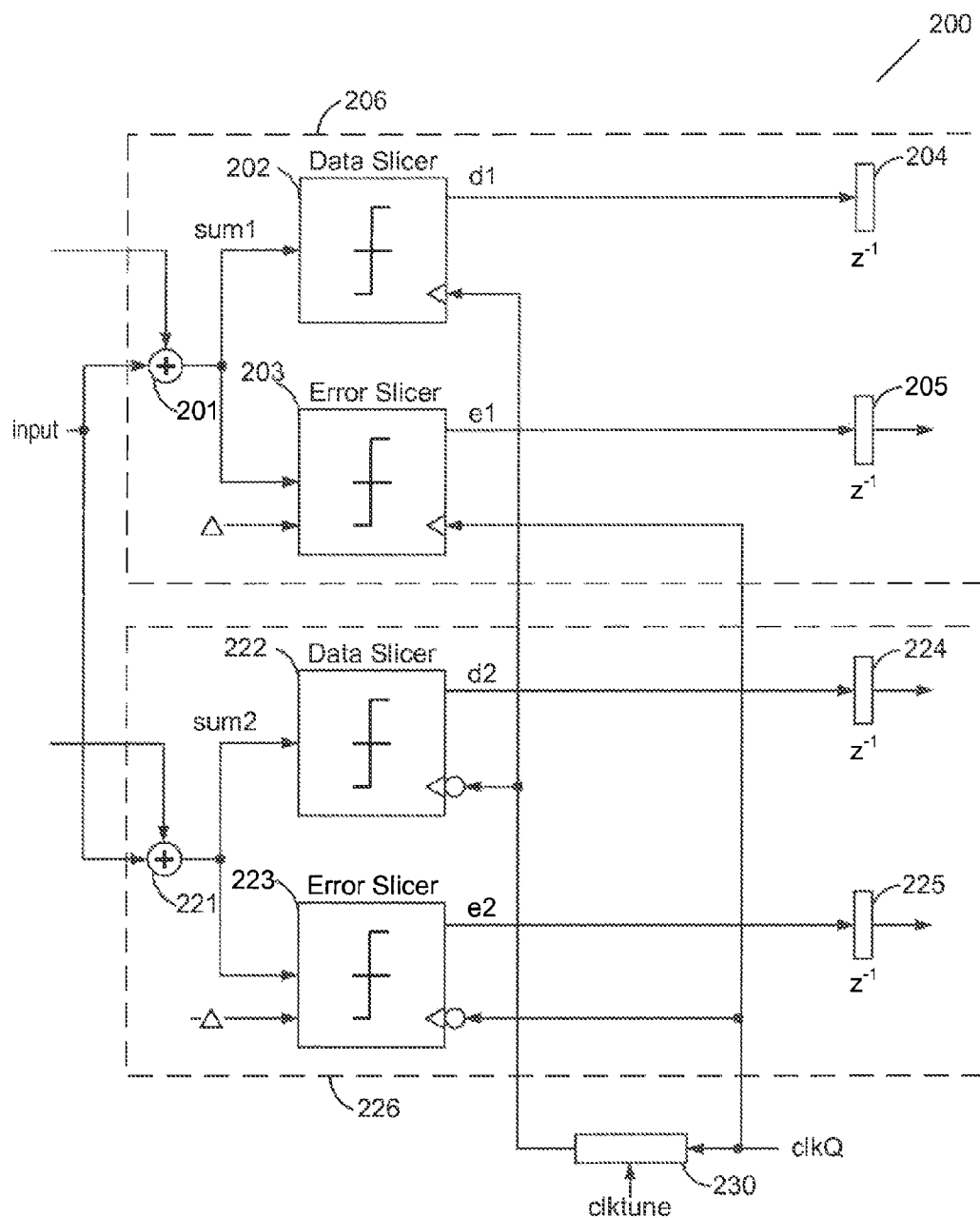
FIG. 2 illustrates an example decision feedback equalizer in accordance with some embodiments of the invention.

FIG. 2 illustrates an example embodiment of a decision-feedback equalizer (DFE) architecture 200 used in accordance with some embodiments of the invention. In general, the DFE 200 cancels out additional channel induced ISI. In some embodiments, the DFE 200 is a 4-tap, 2-way interleaved DFE. The example 4-tap, 2-way interleaved DFE 200 is split into two paths that operate at a half data rate. As shown in FIG. 2, an upper path 206 comprises a summer 201, data slicer 202, error slicer 203, and data and error re-timing delay elements 204 and 205. The lower path 226 comprises a summer 221, data slicer 222, error slicer 223, and data and error retiming delay elements 224 and 225.

As shown in FIG. 2, the upper path 206 produces data and error samples and samples at the rising edge of the half-clock rate. The lower path 226 produces data and error samples and samples at the falling edge of the half-clock rate. At the sampling instant for each of the upper path 206 and lower path 226, the data slicer 202 or 222 decides if the output of the corresponding summer 201 or 221 is a logical 1 or 0. At this same instant, the error slicer 203 or 223 compares the output of the corresponding summer 201 or 221 with a target signal eye opening level $\Delta$. In this embodiment, the error decision is valid only if the data decision is a logical 1 for slicer 203 and a logical 0 for slicer 223. This is because slicer 203 compares the input to $+\Delta$ and slicer 223 compares the input with $-\Delta$. In another embodiment, the skew for the clocks between the data slicers 202 and 222 and error slicers 203 and 223 may be adjusted with a digitally-controlled delay line 230. Thus, the sampling instant of the data slicers 202 and 222 can be adjusted relative to the sampling instant of the error slicers 203 and 223.

As shown in FIG. 2, the DFE 200 can retime the data and error decisions with delay elements 204, 205, 224, and 225. The data and error decisions may be retimed and then de-multiplexed into 16-bit words by de-multiplexors 105. The data and error decisions can be used to update the DFE coefficients, $h_1$, $h_2$, $h_3$, and $h_4$. In some embodiments, these coefficients, or taps, are implemented as differential digital to analog converters (DACs). For example, the DFE coefficients $h_1$, $h_2$, $h_3$, and $h_4$ may be implemented as 6-bit, true-zero, differential DACs. Taps $h_1$ and $h_2$ may span half of the maximum full swing of the input while taps $h_3$ and $h_4$ may be half of the span of $h_1$ and $h_2$.

In some embodiments the coefficients $h_1$, $h_2$, $h_3$, and $h_4$ of the DFE 200 in FIG. 2 may be adapted by adaptation logic 112. In some embodiments, the adaptation logic uses a least means square (LMS) algorithm. In these embodiments, the LMS adaptation logic configures the coefficients, or taps, of the DFE from balances derived from the data and error decisions of the DFE 200 through the utilization of an LMS algorithm.

In another embodiment, the coefficients $h_1$, $h_2$, $h_3$, and $h_4$ of the DFE 200 are adapted by the adaptation logic through the calculation of the bit error rate by measuring margin hits and using a steepest descent algorithm. A margin hit occurs when the data and error decisions of DFE 200 differ. For example, referring to the upper path 206 in FIG. 2, if the data slicer 202 outputs a 1 and the error slicer 203 with offset $\Delta$ reports a 0, then a margin hit has occurred. Similarly, for lower path 226, a margin hit occurs if the data slicer 222 reports a 0 while the error slicer 223 with offset $-\Delta$ reports a 1. Thus, in this embodiment, simple bit-wise operations using the 16-bit data and error decisions can be used to derive the number of margin hits that occur. Further details of margin hits are described below with reference to FIG. 6.

Figure 3:
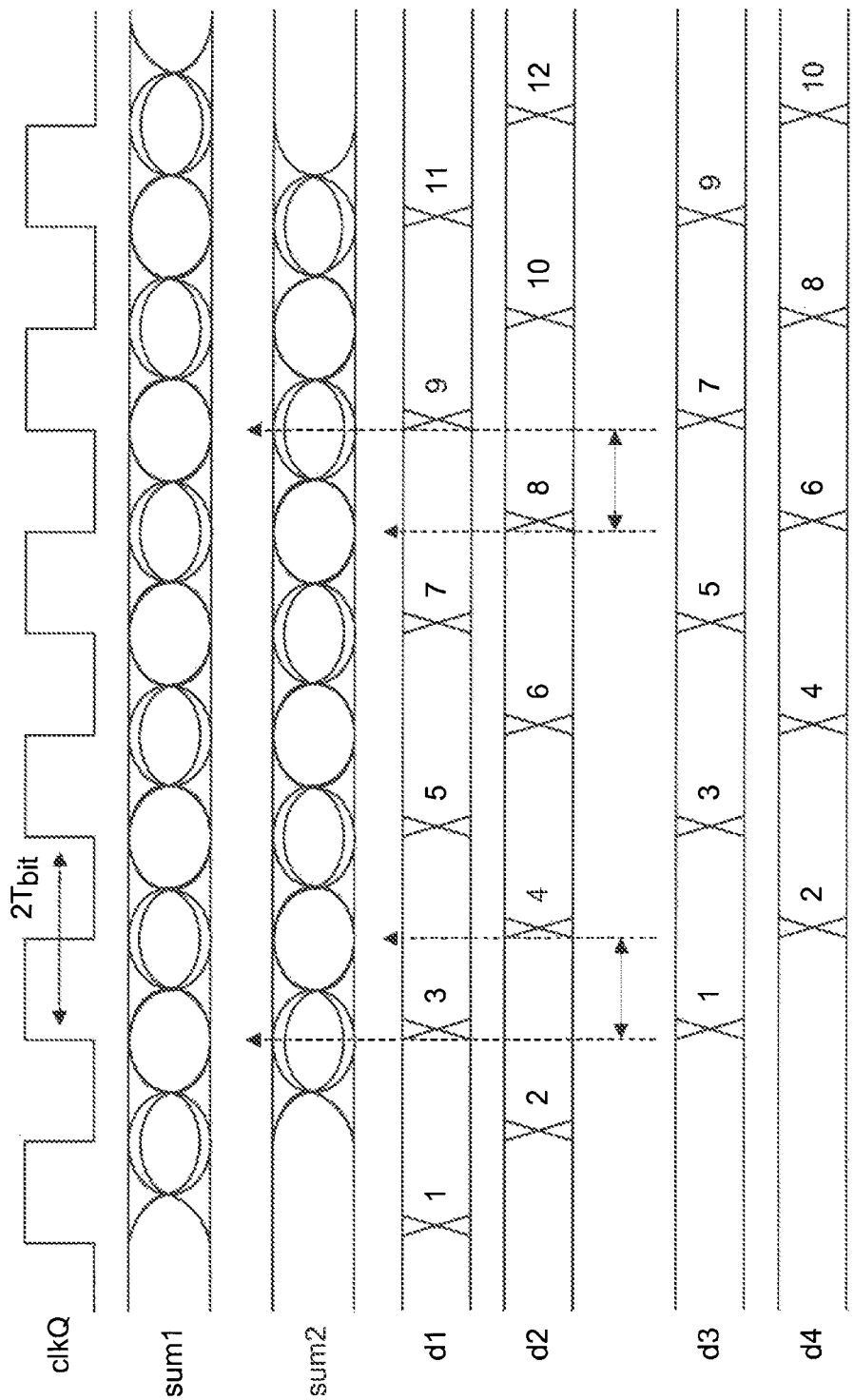
FIG. 3 illustrates a timing diagram of an example decision feedback equalizer.

FIG. 3 illustrates timing of the example DFE 200. In this example, the eye at the signal sum1 must be equalized when the upper path 206 is sampling, but not when the lower path 226 is sampling. Similarly, the eye at the signal sum2 must be equalized when the lower path 226 is sampling. The critical timing path is through the first DFE feedback tap, $h_1$. The slicer decision, $d_1$ or $d_2$, must be multiplied by $h_1$ and summed within a bit time $T_{bit}$. All other feedback paths can settle within $2T_{bit}$ due to the interleaved structure of DFE 200. The swing output of the VGA 102 may be set between 200 mV to 400 mV peak-to-peak differential. The low frequency gain of the linear equalizer 103 is $1-K_{LP}$. At the minimum VGA 102 swing setting, the maximum $K_{LP}$ will be constrained to 0.5. Thus, the minimum swing at the input to the DFE 200 will be 100 mV peak-to peak differential. The DFE 200 swing target, $\Delta$, must also vary as a function of $K_{LP}$. For example, if the gain through the linear equalizer 103 is reduced, $\Delta$ must also be reduced. In an example embodiment, $\Delta$ is digitally controlled. Thus, this tracking can be implemented as a lookup table based on the setting of $K_{LP}$.

Figure 4:
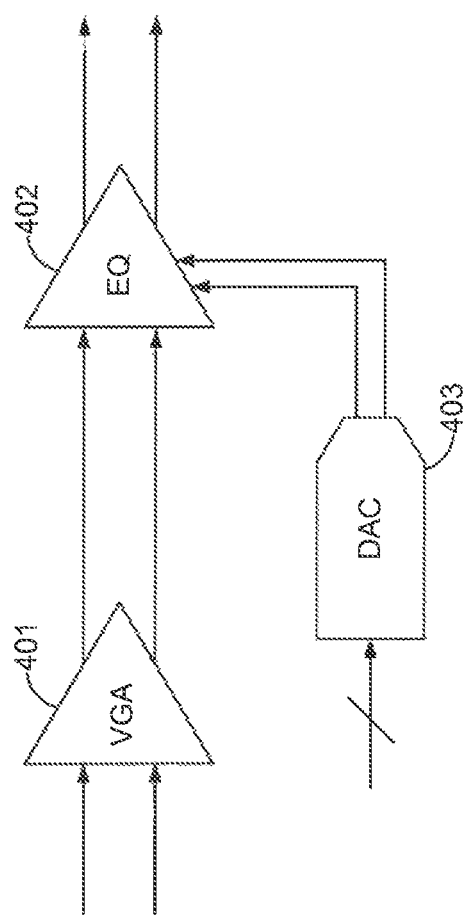
FIG. 4 illustrates an example embodiment of a variable gain amplifier and a linear equalizer with offset cancellation.

FIG. 4 illustrates an example embodiment of a VGA and linear equalizer with offset cancellation. The VGA 401 and linear equalizer 402 may have a differential output offset. In this embodiment, offset cancellation is done in the current domain. Offset from the VGA 401 and the linear equalizer 402 is canceled by the Digital to Analog Converter (DAC) 403. An example of a DAC in accordance with some embodiments of the invention is a 6-bit, current-mode DAC. The DAC 403 injects a differential current into the linear equalizer to cancel out the offset. The output of the DAC 403 varies as the DAC input is changed.

Figure 5:
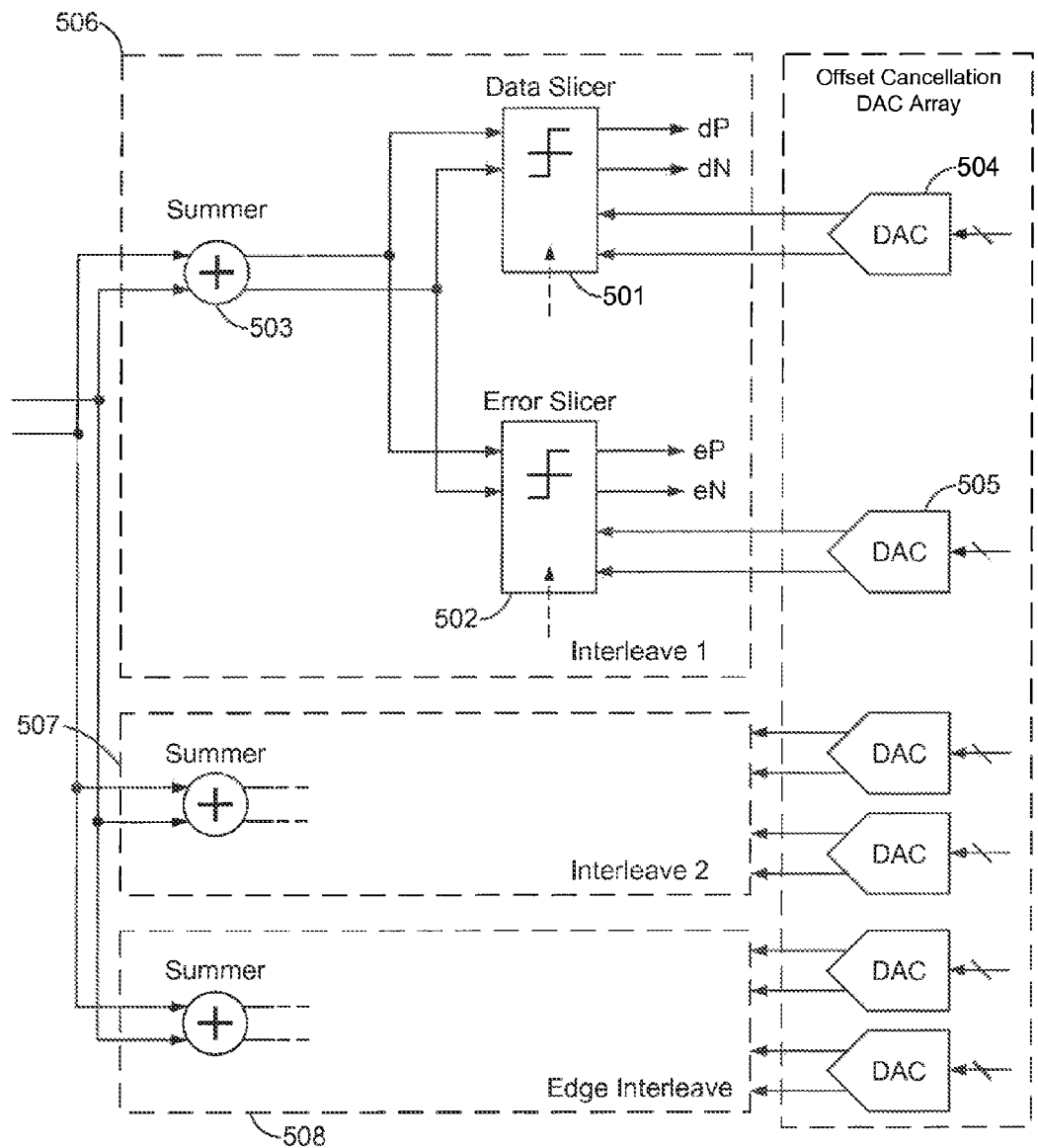
FIG. 5 illustrates an example embodiment of slicers and summers with offset can elation.

FIG. 5 illustrates an example embodiment of offset cancellation distributed throughout the receiver's signal path at slicers and summers within the DFE. The data slicer 501, error slicer 502, and summer 503 offsets are canceled with DACs 504 and 505 that inject a differential current into the slicers 501 and 502 of interleave path 506. The DAC used for the slicer and summer offsets may be a 6-bit, current-mode DAC. The offset cancellation current for the error slicer may also used to produce the equalization swing target, Δ. Similar offset cancellation using DACs is also implemented for the 5 interleave path 507 and the edge interleave path 508 of the DFE. As such, some example embodiments of the receiver 100 may utilize seven DACs for offset cancellation—six for the slicers within the DFE and one at the linear equalizer output.

In operation for some example embodiments, slicer offsets are calibrated once upon receiver startup or reset. A differential 0 is injected at the linear equalizer output, and the output statistics of the slicers 501 and 502 can be analyzed as a function of the DAC input. Offset is calibrated when the slicers 501 and 502 produce a balanced number of 1's and 0's. This step will cancel the offset of each slicer and the summer. These steps may be repeated for the slicers of the interleave path 507 and the edge interleave path. 508

The offset from the VGA and linear equalizer is cancelled after the slicers by monitoring the margin hits between the offset-cancelled error and data slicers. Margin hits are further explained below. As noted earlier, this technique is also used to optimally set the CDR offset.

Figure 6:
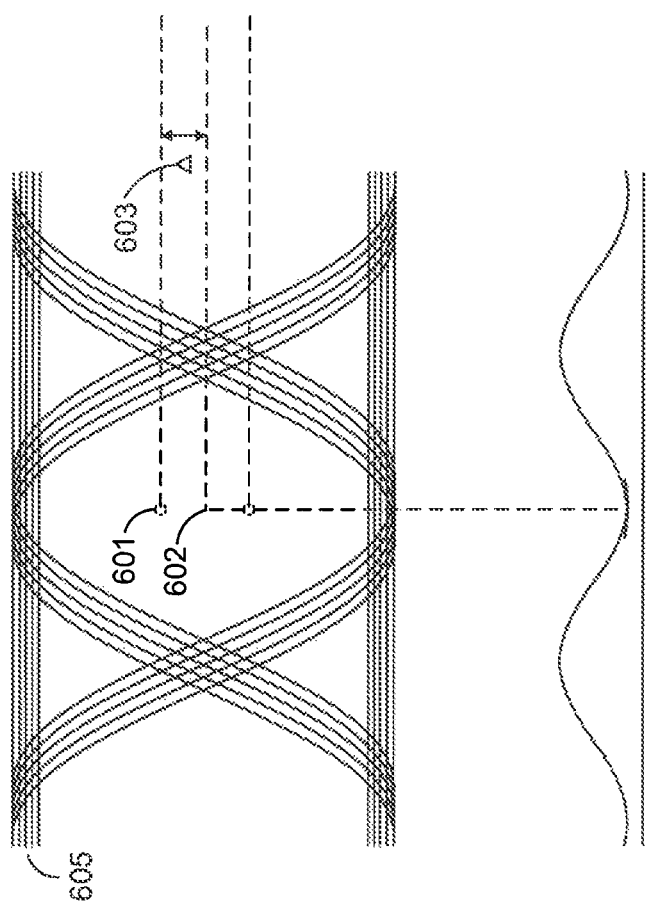
FIG. 6 illustrates the counting of a margin hit on a waveform.

FIG. 6 illustrates margin hits. By using data and error slicers to estimate the eye opening of the summer output 605, the CDR offset and the offset of the VGA and linear equalizer can be calibrated. As seen in FIG. 6, the error and data slicers sample the summer output eye at two points 601 and 602. Ideally, the BER at the error slicer is higher than that of the data slicer since the error slicer is sampling the eye with an offset Δ 603. For an open eye, the data and error slicer decisions will be the same. If the eye is open, but the eye amplitude is less than Δ 603, the data slicer and error slicer decisions will differ. The number of times this event occurs is referred to as margin hits and can be monitored. By monitoring the consistency of the error and data slicer decisions, the CDR offset and other parameters of components within the receiver can be optimally set.

As shown in FIG. 6, margin hits will increase if clkI is to the left or right of the optimal sampling point 604. Sweeping the CDR offset and measuring margin hits can set the CDR offset to the point where the number of margin hits is minimal. Similarly, the offset of the VGA and linear equalizer can be measured and cancelled by monitoring margin hits. The linear equalizer offset DAC 403 input can be swept. This sweeping of the DAC input will shift the error sampling point 601 and data sampling point 602 in the amplitude or y-direction. By monitoring margin hits, an optimal offset current may be found. This example technique may compensate for VCSEL amplitude symmetry, when the amplitude distribution of a 1 is broader than a 0.

Although adjusting of parameters with regard to certain components has been discussed above, it should be appreciated that optimization based on margin hits or LMS can be extended to any parameter of a component in the receiver. For example, adaptation of the DFE coefficients through taps is not limited to LMS. In an alternative embodiment, margin hits may be used to adapt the DFE coefficients by using a steepest descent algorithm or other methods. In another embodiment, the gain of the variable gained amplifier (VGA) is controlled in accordance with the steepest descent with margin hits or LMS methods or algorithms disclosed herein. In another embodiment, the CDR offset discussed in FIG. 1 may be adapted in accordance with the steepest descent algorithm with margin hits or LMS methods or algorithms disclosed herein.

Figure 7:
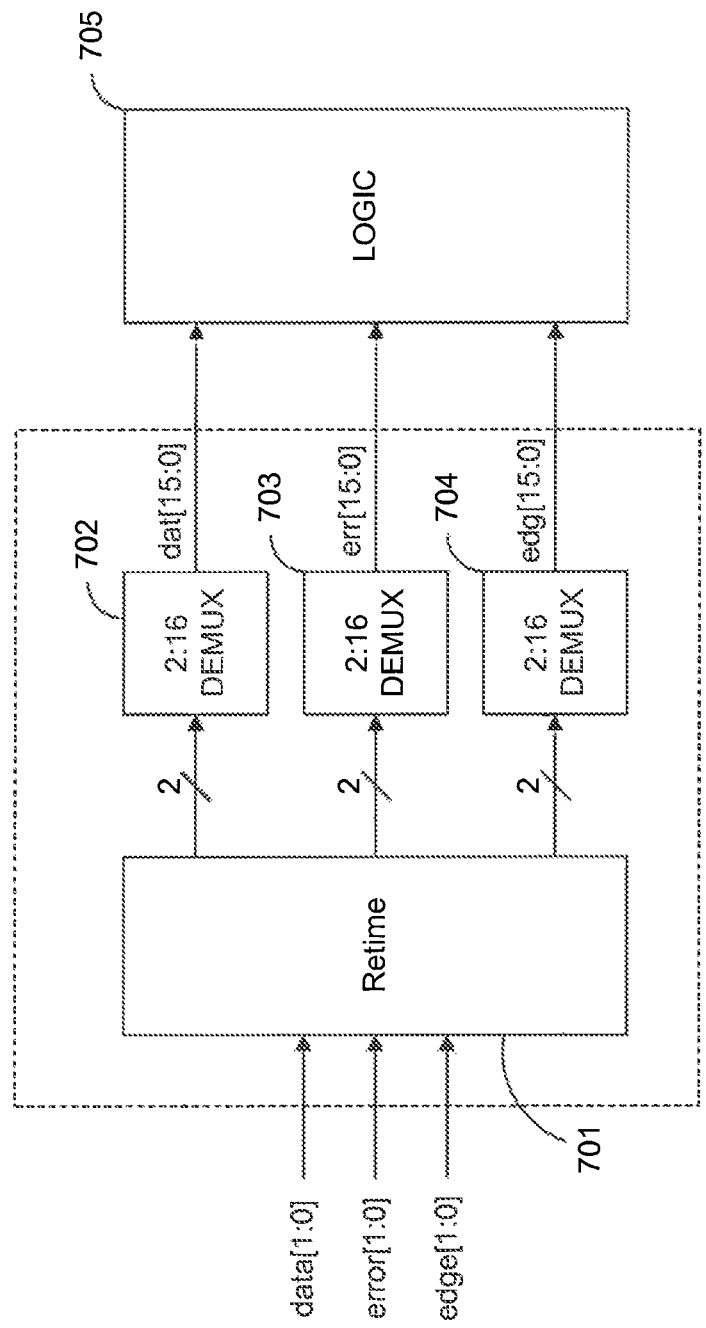
FIG. 7 illustrates an example digital logic circuit in accordance with some embodiments of the invention.

FIG. 7 illustrates an example embodiment of digital logic circuits that may be used in accordance with some embodiments of the invention. The interleaved data, error and edge decisions from the DFE are re-timed by delay element 701 and converted into 16-bit words with custom-designed digital circuits. In this embodiment, the de-multiplexors 702, 703, and 704 convert the interleaved data, error, and edge decisions into 16-bit words. These 16-bit words are structured such that the data, edge, and error decision contained in location n, for n=0 . . . 15, were made at the same sampling instant. Thus, even-indexed error and data decisions are from the upper path 206 of FIG. 2 and odd-indexed error and odd-indexed data decisions are from the lower path 226 of FIG. 2. Each of the 16-bit words—data, error, and edge, are then transmitted to logic 705, which may be a microcontroller, digital logic circuitry, off-chip software, or any other component capable of performing the algorithms disclosed herein. The logic 705 may calculate any or all of the margin hit count, DFE balances, slicer offset balances, and the offset calibration FSM.

Edge and data decisions are used by the CDR FSM of element 705 to lock the CDR and servo the CDR so that the DFE sampling clocks track the input data rate. Balances derived from the data and error decisions are used to update the DFE coefficients based on LMS or a steepest descent algorithm using margin hits. Margin hits may be counted for use in setting the CDR offset, calibrate the offset of the VGA and linear optimizer, and optimize the linear equalizer's settings.

Figure 8:
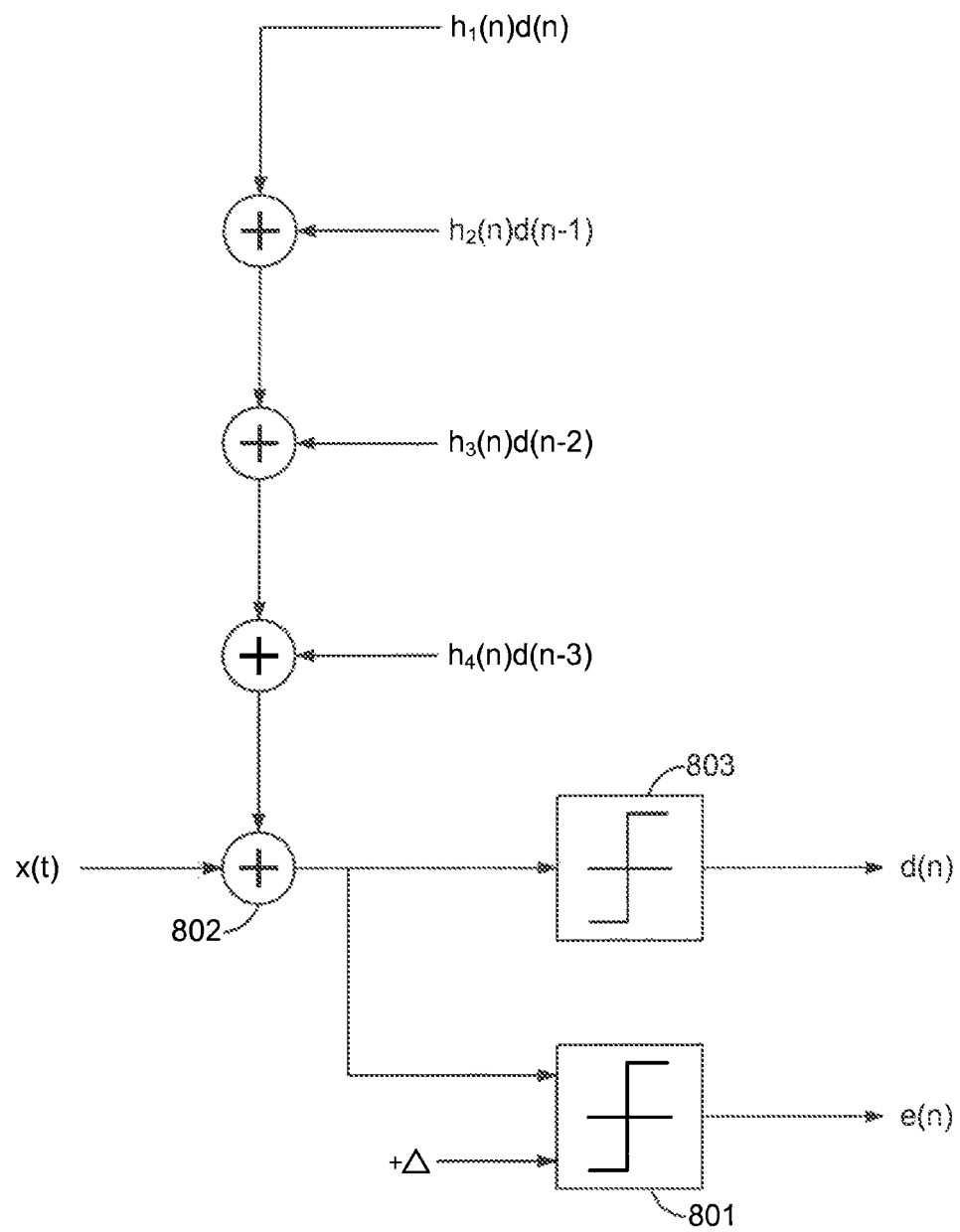
FIG. 8 illustrates an example of decision feedback equalizer coefficients, or taps, and corresponding adjustments.

DFE Balance Calculation:

FIG. 8 illustrates an example embodiment of DFE coefficients or taps. Coefficients $h_1$, $h_2$, $h_3$, and $h_4$ are adapted by correlating the error decision, e(n), to past data decisions, d(n−k) for k=1 . . . 4. In one embodiment, the taps of the DFE are adapted in accordance with the following equations to update the coefficients:

$$h_1(n+1)=h_1(n)+\mu eq(n)d(n-1)$$

$$h_2(n+1)=h_2(n)+\mu eq(n)d(n-2)$$

$$h_3(n+1)=h_3(n)+\mu eq(n)d(n-3)$$

$$h_4(n+1)=h_4(n)+\mu eq(n)d(n-4)$$

In the above equations, μ is the update gain. For illustrative purposes, it is assumed here that e(n)={−1, +1} and d(n)={−1, +1}. Since the error slicer 801 in FIG. 8 compares the summer 802 output with +Δ, e(n) is only valid if d(n)=1 (data slicer 803 output). Thus, the error must be qualified by d(n) before it is used to update the DFE coefficients. The qualified error, eq(n) takes on values −1, +1, or 0, and is calculated as illustrated in Table 1 for +Δ and Table 2 for −Δ error slicers.

TABLE 1

| e(n) | d(n) | eq(n) |
|------|------|-------|
| −1   | −1   | 0     |
| −1   | +1   | −1    |
| +1   | −1   | 0     |
| +1   | +1   | +1    |

TABLE 2

| e(n) | d(n) | eq(n) |
|------|------|-------|
| −1   | −1   | +1    |
| −1   | +1   | 0     |
| +1   | −1   | −1    |
| +1   | +1   | 0     |

As described earlier, the data and error decisions are parallelized into groups of 16-bits. In another embodiment, the data and error decisions are parallelized into 24-bit data decisions and 24-bit error decisions. These parallelized groups will be referred to as the data vector d and error vector e. According to the DFE coefficient update equations, to update $h_1$, the qualified error, eq(n), is multiplied with d(n−1). Thus, to update $h_1$, components 0 to 11 of the qualified error vector, eq, can be multiplied with the components 1 to 12 of d. The products can then be summed, and the sum can be used to update $h_1$. Similarly, for $h_2$, components 0 to 11 of eq can be multiplied with components 2 to 13 of d. The sum of products for a DFE coefficient is referred to as the balance for that coefficient. Thus, a balance, $b_1$, $b_2$, $b_3$, and $b_4$, is calculated for each coefficient $h_1$, $h_2$, $h_3$, and $h_4$. These balances may be calculated in accordance to the following equations:

$$b_1 = \Sigma_{i=0}^{11} eq(i)d(i+1) = \vec{eq}(0\ldots 11) \cdot \vec{d}(1\ldots 12)$$

$$b_2 = \Sigma_{i=0}^{11} eq(i)d(i+1) = \vec{eq}(0\ldots 11) \cdot \vec{d}(2\ldots 13)$$

$$b_3 = \Sigma_{i=0}^{11} eq(i)d(i+1) = \vec{eq}(0\ldots 11) \cdot \vec{d}(3\ldots 14)$$

$$b_4 = \Sigma_{i=0}^{11} eq(i)d(i+1) = \vec{eq}(0\ldots 11) \cdot \vec{d}(4\ldots 15)$$

The balance should be represented as a signed binary value. It may prove useful to include a programmable digital filter to filter the balances $b_1$, $b_2$, $b_3$, and $b_4$ over time so that balance dither can be traded against adaptation convergence speed. The bandwidth and gain of the filter may also be programmable.

The balances can then be used as followed to update the DFE coefficients for the taps:

$$h_1(n+1) = h_1(n) + \mu b_1$$

$$h_2(n+1) = h_2(n) + \mu b_2$$

$$h_3(n+1) = h_3(n) + \mu b_3$$

$$h_4(n+1) = h_4(n) + \mu b_4$$

Balances may also be filtered with a programmable IIR filter with a bandwidth programmable from 50 kHz to 400 kHz.

Although a DFE with four coefficients and taps are disclosed above, those skilled in the art would understand and appreciate that a DFE of any number of taps could be practiced in accordance with some embodiments of the invention.

Figure 9:
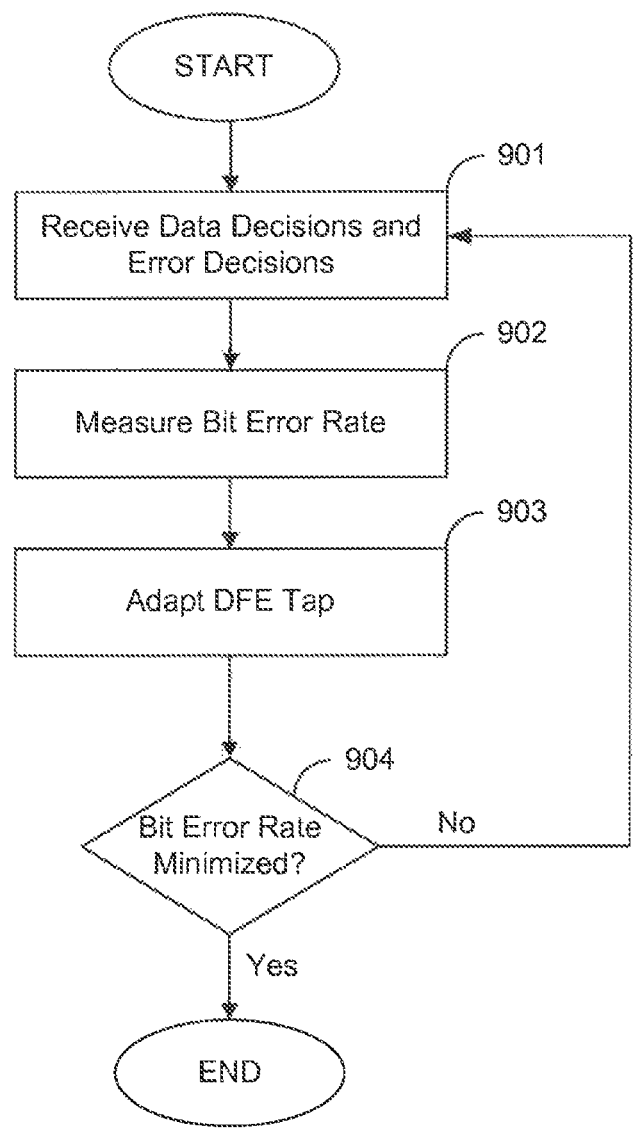
FIG. 9 is a flow diagram illustrating one embodiment for adapting the coefficients, or taps, of a decision feedback equalizer.

FIG. 9 is a flow diagram illustrating one embodiment for adapting a coefficient, or tap, of a decision feedback equalizer. In general, the decision feedback equalizer generates data decisions, error decisions, and edge decisions. In some embodiments, these decisions may be parallelized into 16-bit words by de-multiplexors. At block 901, the data, error, and edge 16-bit words from the de-multiplexors are received at a digital computational circuit such as adaptation logic. In general, the digital computational circuit calculates and tracks circuit settings to ensure that the receiver is properly functioning. At block 902, the digital computational circuit calculates the bit-error rate (BER) of the data. In some embodiments, the BER is derived from margin hits derived from the data and error decisions as described above. Next, at block 903, the digital computational circuit adapts the coefficients, or taps, of the DFE, as described above. In some embodiments, these taps may be adapted by means of a least means squared (LMS) algorithm. In other embodiments, these taps may be independently adapted by means of a steepest descent algorithm, as discussed below. At block 904, the digital computation circuit will continue an iteration of the previous steps until optimal performance and a minimum bit error rate is achieved. These iterations may be performed under a steepest descent algorithm. In other embodiments, these iterations may utilize an LMS algorithm. These steps 901, 902, 903, and 904 may be performed on any number of the taps of the DFE to update the corresponding coefficients.

Offset Balance Calculation:

As described above with reference to FIG. 3, the data, error, and edge slicers are calibrated with a DAC converter that injects a differential current into the linear equalizer. The number of 1's and 0's at the slicer outputs are monitored as the slicer offset currents are swept. The calibration stops when the slicers output an equal number of 1's and 0's. An offset balance is maintained for each slicer. The even-indexed bits from the 16-bit data and error decision vectors are decisions from the data and error slicers in the upper path 206 of FIG. 2. Similarly, decisions from the data and error slicers in lower path 226 of FIG. 2 are taken from the odd-indexed bits from the 16-bit data and error decision vector. Thus, the balances for the data, error, and edge slicers are calculated as follows:

Data Slicer Balance(upper path)=sum(data[$i$]), for $i$=0,2,4,6,…

Error Slicer Balance(upper path)=sum(error[$i$]), for $i$=0,2,4,6,…

Data Slicer Balance(lower path)=sum(data[$i$]), for $i$=1,3,5,7,…

Error Slicer Balance(lower path)=sum(error[$i$]), for $i$=1,3,5,7,…

Edge Slicer 1 Balance=sum(edge[$i$]), for $i$=1,3,5,7,…

Edge Slicer 2 Balance=sum(edge[$i$]), for $i$=1,3,5,7,…

The slicer calibration DAC input is swept while the corresponding slicer balance is monitored. A programmable digital filter may be used to filter the balances over time so that balance dither can be traded against calibration convergence speed. The bandwidth of the filter is programmable at, for example, 50 kHz, 100 kHz, 200 kHz, or 400 kHz. Logic 705 of FIG. 7, such as an on-chip microcontroller, can be programmed to calibrate the slicer offsets using the offset balances.

Figure 10:
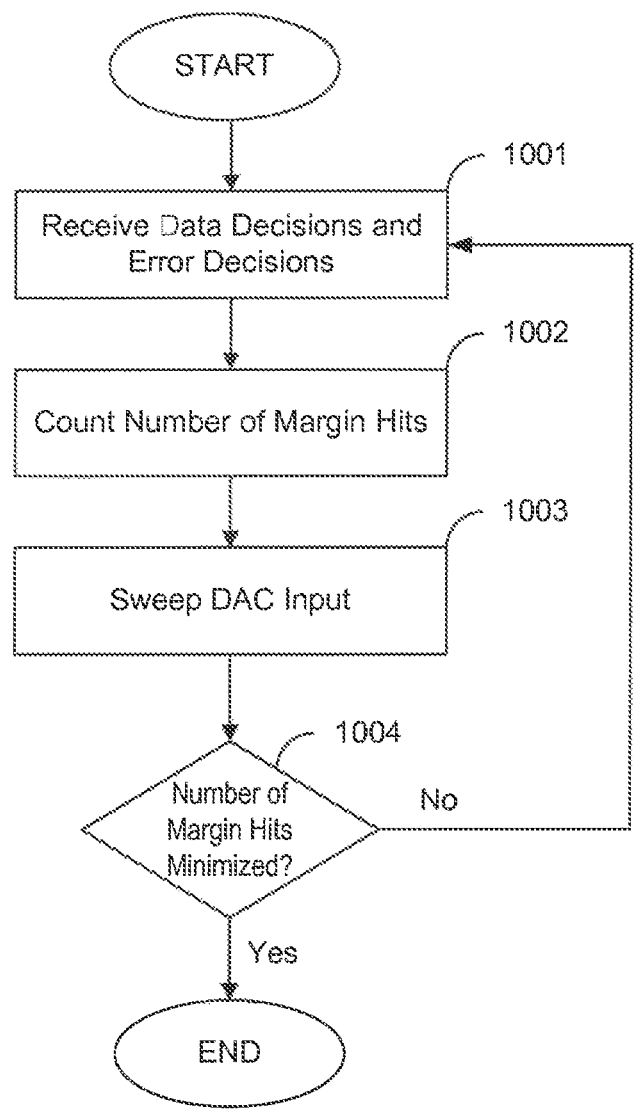
FIG. 10 is a flow diagram illustrating one embodiment for offset cancellation of the VGA and linear equalizer.

FIG. 10 is a flow diagram illustrating one embodiment for offset cancellation of the VGA and linear equalizer. As described above, a DAC injects a differential current into the linear equalizer. At block 1001, data decisions and error decisions are received. At block 1002, the number of margin hits is derived from the data decisions and the error decisions. These data decisions and error decisions may be from the outputs of the slicers of the DFE. At block 1003, the DAC input is changed or swept across a range of input values. In some embodiments, the DAC input may be incremented or decremented a particular step size or amount. At block 1004, the sweeping, incrementing, decrementing or change of the DAC input is halted when the number of margin hits has been minimized. The repeating process of block 1004 may repeat the receiving of the data and error decisions, counting the margin hits, and the sweeping of the DAC input. This process may use an LMS algorithm or a steepest descent algorithm to minimize the number of margin hits.

Figure 11:
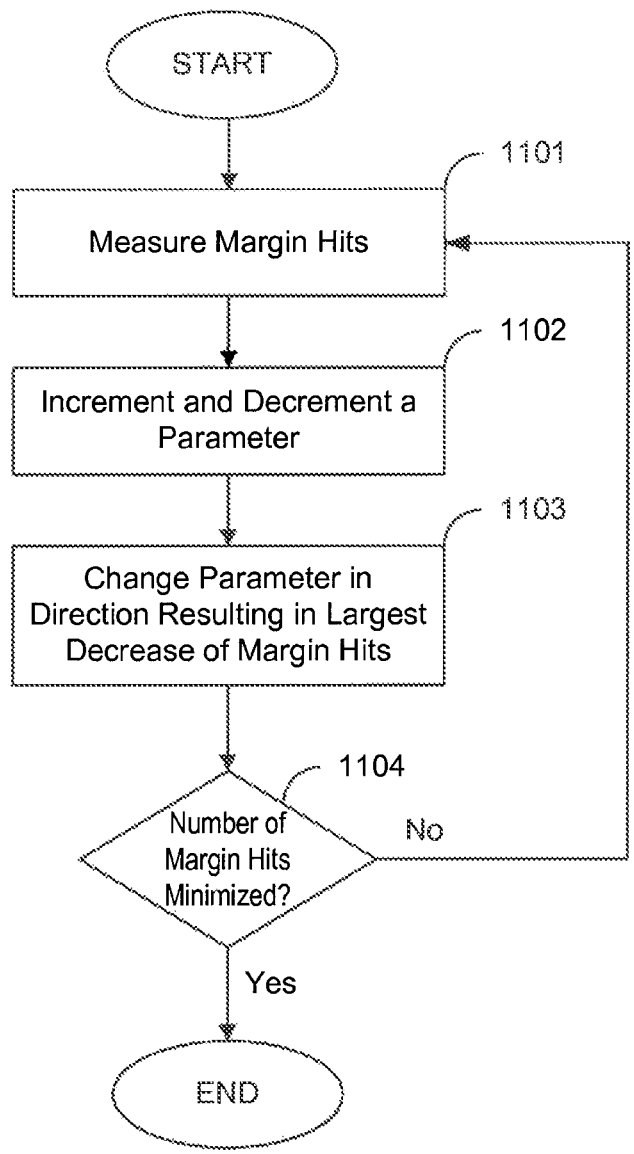
FIG. 11 is a flow diagram illustrating an example steepest descent algorithm that may use margin hits for adapting a parameter.

FIG. 11 is a flow diagram illustrating an example steepest descent algorithm that may use margin hits for adapting a parameter for any of the components discussed herein. A steepest descent algorithm is a mathematical tool for numerically finding the minimum value of a particular function. The steepest descent algorithm utilizes a gradient function to determine the direction in which a function is increasing or decreasing most rapidly. Successive iterations of the steepest descent algorithm moves along this direction for a determined step size, and then recomputes the gradient to determine the new direction for the step size. At block 1101, the number of margin hits is measured. As described above, adaptation logic may measure the number of margin hits by using the data and error slicer decisions. At block 1102, the parameter is incremented up a value and decremented down a value. The number of margin hits for each of the incrementing and the decrementing of the parameter is measured. At block 1103, the parameter is then changed in the direction that, results in the largest, or steepest, decline in the number of margin hits. At block 1104, the previous steps are repeated in one or more successive iterations until the number of margin hits has been minimized.

Other Details:

The linear equalizer can be adapted by monitoring the margin count while sweeping $K_{LP}$. The calibration stops when $K_{LP}$ minimizes the margin count. This calibration loop can be done with the on-chip microcontroller or tests with off-chip software. Note that the gain of the linear equalizer is a function of $K_{LP}$:

$$G_{eq}=1/(1-K_{LP}).$$

Thus, the error slicer offset, $\Delta$, must be adjusted as a function of $K_{LP}$. A lookup table may be used to map $K_{LP}$ to an appropriate value for $\Delta$.

The gain of the linear equalizer must also be constrained depending on the output swing of the VGA. The minimum output swing of the VGA is 200 mV, differential peak-to-peak. In this case, $K_{LP}$ should be constrained about 0.5 to relax the offset requirements of the slicers. Thus, the minimum swing at the input to the DFE is expected to be 100 mV differential peak-to-peak.

Example Startup and Calibration Sequence

Figure 12:
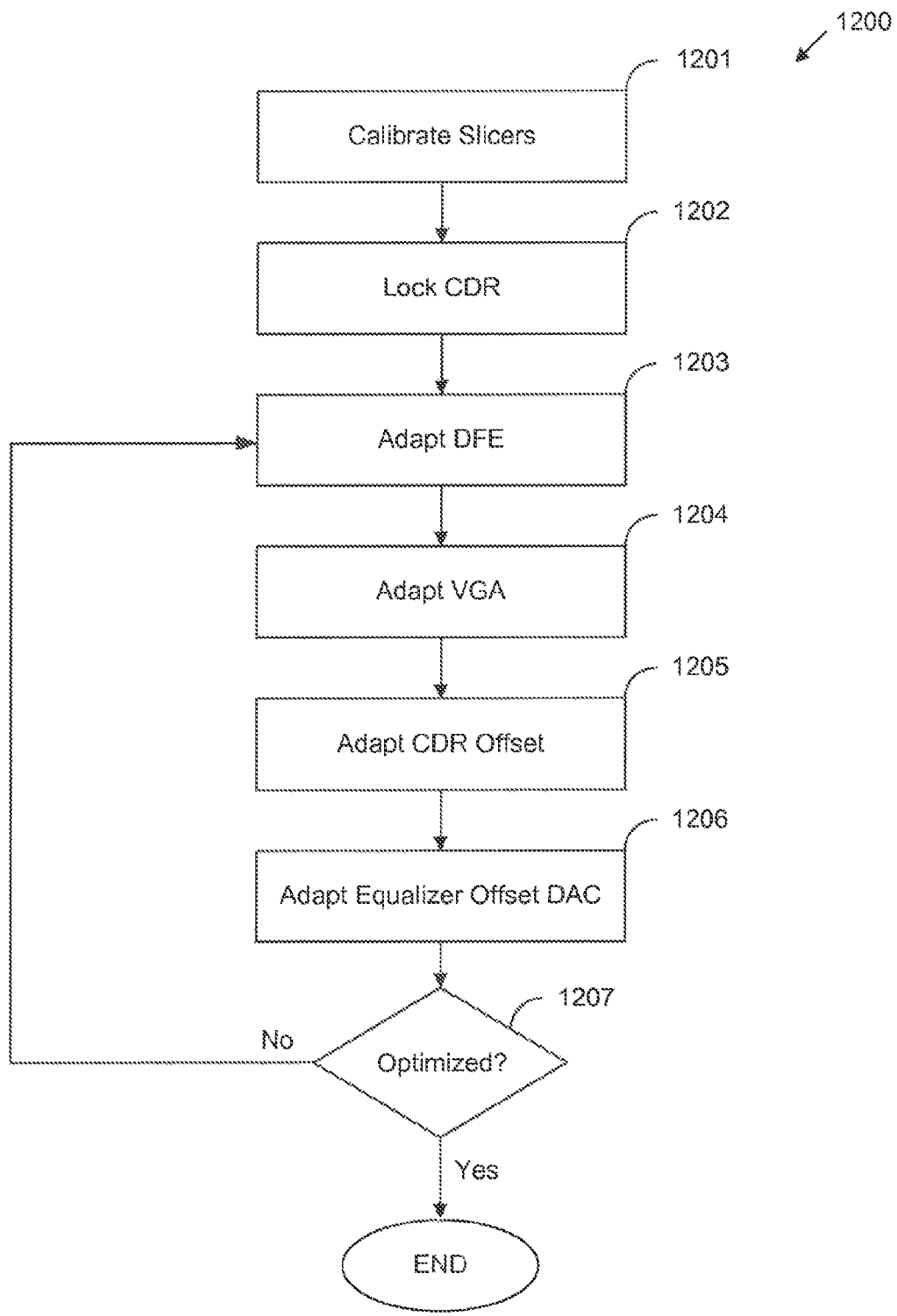
FIG. 12 is a flow diagram illustration one embodiment of a startup and calibration sequence for a receiver.

FIG. 12 is a flow diagram illustrating one embodiment of an example startup and calibration sequence 1200 for a receiver. At block 1201, the slicers are calibrated. In some embodiments, the calibration of the slicers is done through the use of the DACs. The slicer offset is calibrated when the slicers produce a balanced number of 1's and 0's. At block 1202, the CDR is locked and the initial CDR offset is 0. At block 1203, the coefficients or taps of the DFE are adapted by means of using LMS balances or a steepest descent algorithm using margin hits. Next, at block 1204, the VGA is adapted by means of LMS balances or a steepest descent algorithm using margin hits. At block 1205, the CDR offset is adapted by using a steepest descent algorithm with margin hits. At block 1206, the equalizer offset DAC is adapted using a steepest descent algorithm with margin hits. At block 1207, the adaptation of the parameters of the DFE, VGA, CDR Offset, and Equalizer Offset DAC continue until each of the components is independently optimized to produce a minimal bit error rate.

FIG. 12 illustrates that the parameters of several components of a receiver may be adapted. However, one skilled in the art will recognize that the adaptation techniques disclosed herein can be applied to any other component with adaptable parameters. Furthermore, the example startup and calibration sequence of FIG. 12 can include all or any number of the blocks 1201, 1202, 1203, 1204, 1205, and 1206 and in varying sequence.

Figure 13:
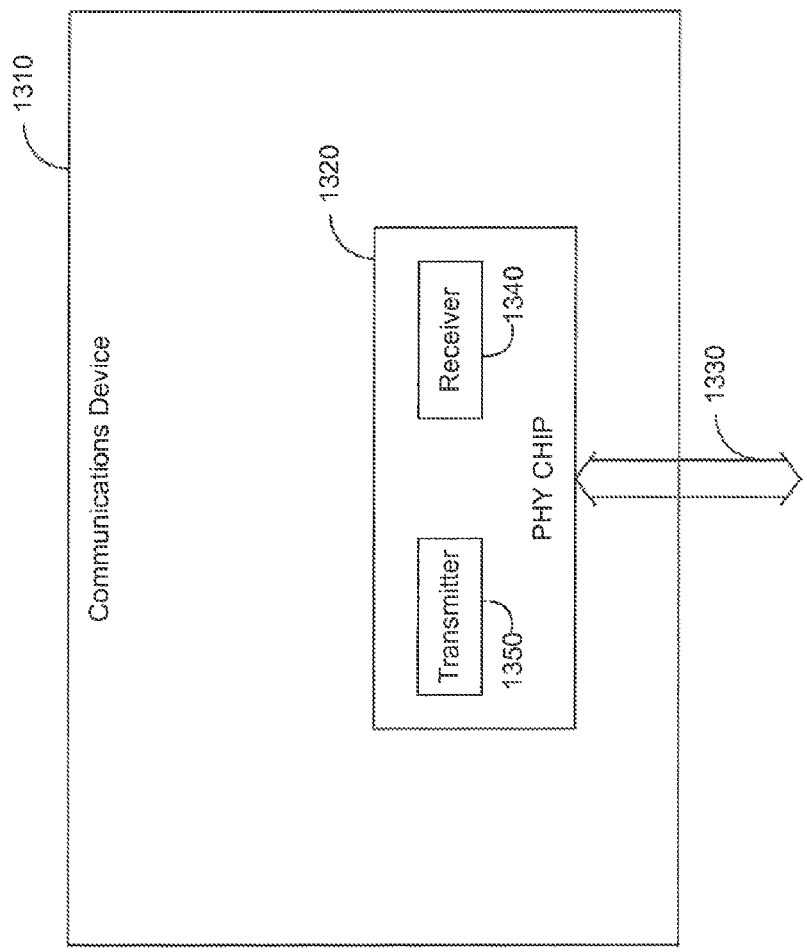
FIG. 13 is a block diagram that illustrates one embodiment for implementing the receiver system, circuit, and method on a single integrated circuit ("IC").

Application Embodiments:

The systems, circuits, and methods disclosed herein may be implemented on one or more integrated circuits. FIG. 13 is a block diagram illustrating one embodiment for implementing the systems, circuits, and methods of the present invention on a single integrated circuit. In some embodiments, a physical layer ("PHY Layer") integrated circuit 1320 is used to define electrical and physical specifications for a communications device 1310. As such, the PHY Layer integrated circuit 1320 may define the relationship between the communications device 1310 and a transmission medium 1330. The PHY Layer integrated circuit 1320 may consist of the basic hardware transmission technologies of a network and provide related functions and services. For example, the PHY Layer integrated circuit may, but is not limited to, establish and terminate a connection to a transmission medium 1330, modulate or convert between the representation of digital data used in the communications device 1310 and the corresponding signals transmitted over the transmission medium 1330, providing a standardized interface to the transmission medium 1330, line coding, bit synchronization, circuit switching, multiplexing, forward error correction, and/or bit-interleaving.

In some embodiments, the PHY Layer integrated circuit 1320 may consist of a transmitter 1350 and a receiver 1340. In general, the transmitter 1350 may modulate and condition data streams for transmission over a transmission medium 1330 and the receiver 1340 may modulate and condition data streams transmitted to the receiver 1340 over a transmission medium 1330. In some embodiments, the transmitter 1350 and/or the receiver 1340 may comprise the systems, methods, and circuits discussed with relation to FIGS. 2, 4, and 5. In the same or alternative embodiments, the transmitter 1350 and/or receiver 1340 may comprise the method discussed with relation to FIG. 12. In some embodiments, the PHY Layer integrated circuit 1320 may operate as a transceiver such that the circuit both transmits data over the transmission medium 1330 and receives data from the transmission medium 1330. However, in some embodiments, each of the receiver 1340 and the transmitter 1350 may be implemented as a single integrated circuit. As such, the PHY Layer integrated circuit 1320 may be implemented in the form of a plurality of integrated circuits. Moreover, the transmitter 1350 and/or the receiver 1340 may each comprise IP blocks for incorporation into one or more integrated circuits. Although the PHY Layer integrated circuit 1320 has been discussed with relation to the transmitter 1350 and receiver 1340, it should be appreciated that the PHY Layer integrated circuit 1320 may comprise other hardware components, logical blocks, or integrated circuits that may implement the systems, methods, and circuits disclosed herein. As such, the PHY Layer integrated circuit 1320 may comprise any combination or number of receivers 1340, transmitters 1350, hardware components, logical blocks, and/or integrated circuits.

The transmission medium 1330 may transmit and receive data to and from the PHY Layer integrated circuit 1320 in order to facilitate data communication over a network. Examples of a transmission medium may comprise, but are not limited to, metallic cables, fiber optic cables, and a wireless network. In some embodiments, if a metallic cable is used as the transmission medium 1330, then the PHY Layer integrated circuit 1320 may convert data received from the transmission medium 1330 into electrical signals. In other embodiments, if a fiber optical cable is used as the transmission medium 1330, then the PHY Layer integrated circuit 1320 may convert data received from the transmission medium 1330 into luminous signals. Similarly, in some embodiments, if a wireless network is used as the transmission medium 1330, then the PHY Layer integrated circuit 1320 may convert data received from the transmission medium 1330 into electromagnetic signals. As such, in some embodiments, the PHY Layer integrated circuit 1320 receives data from the transmission medium 1330 and converts the data into signals representing binary 0's and 1's. This converted data may then be received by another component comprised within communications device 1310.

The PHY Layer integrated circuit 1320 may be configured to function with relation to a variety of protocols used by the communications device 1310. For example, the PHY Layer Integrated circuit 1320 may be configured to function with regard to an IEEE 802.3 standard such as a 10 Gigabit Ethernet (10 GigE) standard. The PHY Layer integrated circuit 1320 may be configured to function in conjunction with other protocols. Examples of such protocols may comprise, but are not limited to, Synchronous Optical Networking (SONET)/Synchronous Digital Hierarchy (SDH), V. 92 for telephone network modems, Infrared Data Association (IrDA) Physical Layer, Universal Serial Bus (USB) Physical Layer, Recommended Standard 232 (RS-232), RS-422, RS-423, RS-449, RS-485, Ethernet Physical Layer (10Base-T, 10BASE2, 100BASE-TX, 10 GigE, etc.), 802.11 Wi-Fi Physical Layers, Digital Subscriber Line (DSL), Integrated Services Digital Network (ISDN), Optical Transport Network (OTN), Bluetooth Physical Layer, and Firewire.

In some embodiments, the PHY Layer integrated circuit 1320 may receive data or a request from another hardware component or software module within the communications device 1310. A software module or hardware component operating at a Data Link Layer may transmit data and/or requests to the PRY Layer integrated circuit 1320. For example, the PHY Layer integrated circuit 1320 may translate logical communication requests from the software module or component operating at a Data Link. Layer into hardware specific operations that may affect the transmission or reception of electronic signals over the transmission medium 1330. As such, in some embodiments, the PHY Layer integrated circuit 1320 may communicate and interact with software modules or another component operating at another portion or layer of a communications system. For example, the PRY Layer integrated circuit 1320 may communicate with another software module or another hardware component operating within the Physical Layer, Data Link Layer, Network Layer, Transport Layer, Session Layer, Presentation Layer, and/or Application Layer. As such, the PRY Layer integrated circuit 1320 may be comprised within a communications device 1310 that may also comprise other software modules or hardware components that directly or indirectly communicate with the PHY Layer integrated circuit 1320.

As a result, in some embodiments, the PHY Layer integrated circuit 1320 may receive data from a transmission medium 1330. The PHY Layer integrated circuit 1320 may convert the data and the resulting converted data may be used by other software modules or hardware components within the communications device 1310 or in a separate communications device.

The communications device 1310 may comprise a hardware component configured to operate within a network environment. Examples of a communications device 1310 that may comprise the PHY Layer integrated circuit 1320 are, but are not limited to, a network adapter, network interface controller (NIC), repeater, network hub, switch, router, modem, USB controller, Serial ATA controller, SDRAM chip interface, flash memory chip interface, transceiver, or a host bus adapter (HBA). The communications device 1310 may comprise, but is not limited to, components of an optical fiber network, such as those components mentioned earlier or a fiber media converter, an add-drop multiplexer (ADM), reconfigurable optical add-drop multiplexers (ROADMs), a regenerator, or a digital cross connect system (DCS). As such, the communications device 1310 may comprise at least one hardware component configured to operate within a network environment.

Figure 14:
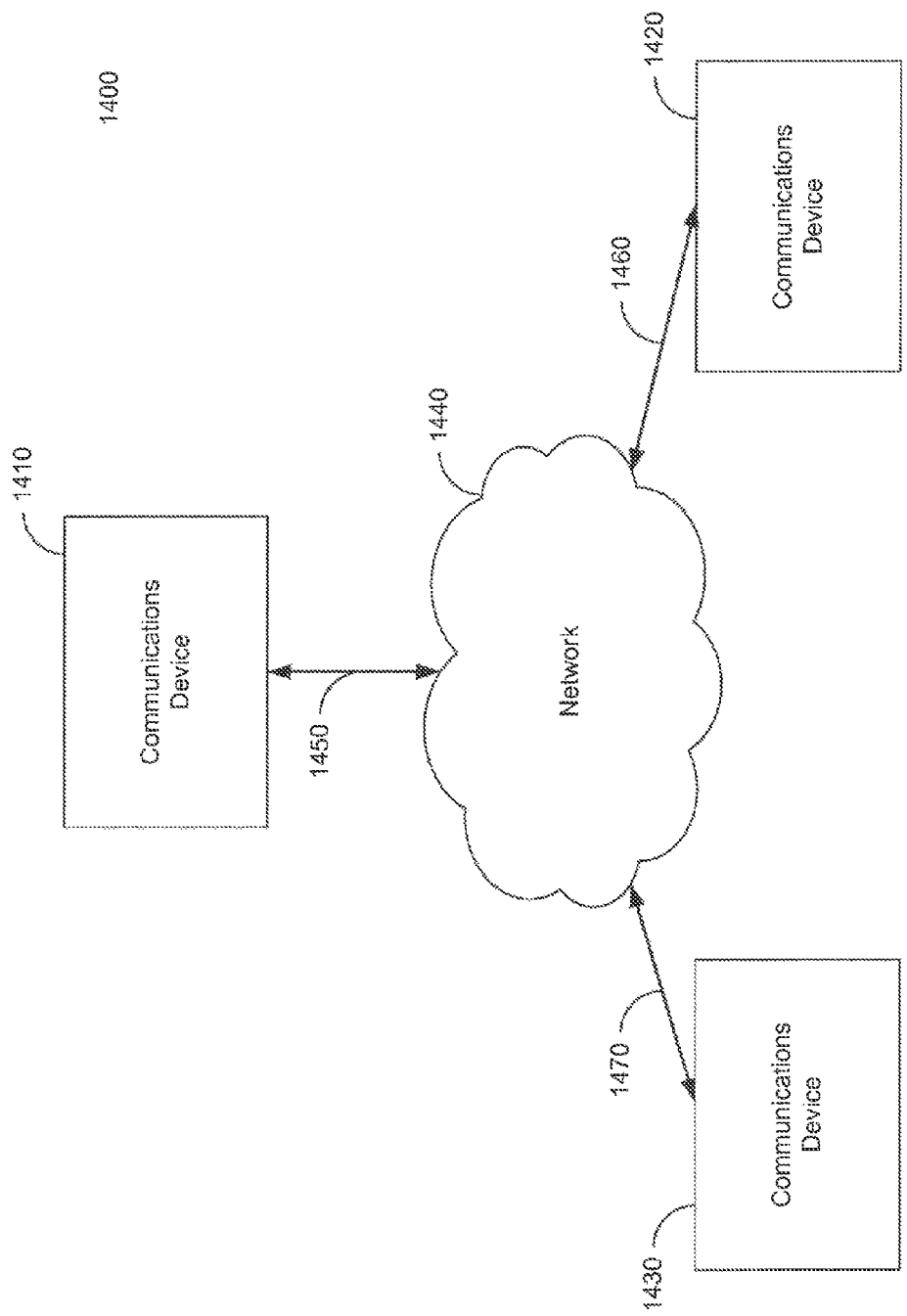
FIG. 14 is a block diagram illustrating one embodiment of a network system that incorporates the receiver system, circuits, and methods of the present invention.

FIG. 14 is a block diagram illustrating an example embodiment of a network system 1400 that may incorporate the systems, circuits, and methods disclosed herein. In some embodiments, one or more communication devices 1410, 1420, and 1430 are coupled to a network 1140 by a transmission medium. 1450, 1460, or 1470. In some embodiments, the communication device 1410 may comprise a router coupled to one or more computer devices (not shown) such that the computers are coupled to the network 1440 by means of the router. The router may incorporate one or more PHY Layer integrated circuits 1320. In turn, the PHY Layer integrated circuits may incorporate a receiver and/or a transmitter. In some embodiments, the PHY Layer integrated circuits comprise, at least in part, the various components discussed with relation to FIGS. 2, 4, and 5. In other embodiments, the PHY Layer integrated circuits comprise, at least in part, the method of FIG. 12.

In operation, the router 1420 may use a PHY Layer integrated circuit 1320 to transmit data to communications device 1430. As such, the PRY Layer integrated circuit 1320 may be enabled to transmit data from the communication device 1410 over the transmission medium 1450, through the network 1440, to transmission medium 1460 to communications device 1420. The communications device 1420 may also comprise PHY Layer integrated circuit 1320 that is configured to receive data over the transmission medium 1460.

Hardware Embodiments:

These of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal (presumably previously defined broadly). In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A receiver comprising:
a differential digital to analog converter that provides a coefficient to a decision feedback equalizer; and
a logic module configured to iteratively adapt the coefficient of the decision feedback equalizer based on decisions generated by the decision feedback equalizer until a bit-error rate is minimized.

2. The receiver of claim 1, wherein the decision feedback equalizer comprises:
a data slicer configured to generate data decisions; and
an error slicer configured to generate error decisions,
wherein the decisions generated by the decision feedback equalizer comprise the data decisions and the error decisions.

3. The receiver of claim 1, wherein the logic module is further configured to calculate the bit-error rate based on the decisions generated by the decision feedback equalizer.

4. The receiver of claim 1, wherein the coefficient spans half of a maximum swing of an input to the decision feedback equalizer.

5. The receiver of claim 4, wherein the decision feedback equalizer further comprises another coefficient, which spans half the span of the coefficient.

6. The receiver of claim 1, wherein the logic module is further configured to adapt the coefficient using a steepest descent algorithm.

7. The receiver of claim 1, wherein the logic module is further configured to adapt the coefficient using a least means square algorithm.

8. The receiver of claim 7, wherein the logic module is further configured to calculate a balance of the coefficient based on the decisions generated by the decision feedback equalizer.

9. The receiver of claim 1, further comprising:
a de-multiplexor configured to format the decisions generated by the decision feedback equalizer.

10. The receiver of claim 1, wherein the differential digital to analog converter is an n-bit, true-zero differential digital to analog converter.

11. An integrated circuit comprising:
a transmitter configured to transmit data over a network; and
a receiver configured to receive data from the network, the receiver comprising:
a differential digital to analog converter that provides a coefficient to a decision feedback equalizer; and
a logic module configured to iteratively adapt the coefficient of the decision feedback equalizer based on decisions generated by the decision feedback equalizer until a bit-error rate is minimized.

12. The integrated circuit of claim 11, wherein the integrated circuit is disposed in a network communication device.

13. A method for adapting a coefficient of a decision feedback equalizer, the method comprising:
receiving a plurality of decisions generated by a decision feedback equalizer;
adapting a coefficient, provided by a differential digital to analog converter, of the decision feedback equalizer based on the plurality of decisions; and
repeating the receiving and the adapting until a bit-error rate is minimized.

14. The method of claim 13, wherein the plurality of decisions comprise a data decision and an error decision.

15. The method of claim 13, further comprising calculating the bit-error rate based on the plurality of decisions.

16. The method of claim 15, wherein the calculating the bit-error rate based on the plurality of decisions comprises:
determining margin hits based on the plurality of decisions, and
calculating the bit-error rate based on the margin hits.

17. The method of claim 13, wherein the adapting the coefficient comprises using a steepest descent algorithm.

18. The method of claim 13, wherein the adapting the coefficient comprises using a least means square algorithm.

19. The method of claim 18, further comprising calculating a balance of the coefficient based on the plurality of decisions.

20. The method of claim 13, further comprising formatting, by a de-multiplexor, the plurality of decisions generated by the decision feedback equalizer.

* * * * *